United States Patent
MacLeod

(10) Patent No.: US 7,110,439 B2
(45) Date of Patent: Sep. 19, 2006

(54) SYSTEM FOR DECREASING PROCESSING TIME IN AN ITERATIVE MULTI-USER DETECTOR SYSTEM

(75) Inventor: Robert B. MacLeod, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 835 days.

(21) Appl. No.: 10/105,918

(22) Filed: Mar. 25, 2002

(65) Prior Publication Data

US 2003/0182369 A1 Sep. 25, 2003

(51) Int. Cl.
*H04B 1/707* (2006.01)

(52) U.S. Cl. ....................... 375/147
(58) Field of Classification Search ........ 375/142, 375/346
See application file for complete search history.

(56) References Cited

U.S. PATENT DOCUMENTS

| | | | |
|---|---|---|---|
| 5,790,606 A | 8/1998 | Dent | |
| 5,982,813 A | 11/1999 | Dutta | |
| 6,122,269 A | 9/2000 | Wales | |
| 6,198,775 B1 | 3/2001 | Khayrallah | |
| 6,219,314 B1 | 4/2001 | Versleegers | |
| 6,553,518 B1 * | 4/2003 | Ware et al. ........... | 714/704 |
| 6,839,390 B1 * | 1/2005 | Mills ................... | 375/341 |
| 2002/0181555 A1 | 12/2002 | Roumy et al. | |
| 2003/0198305 A1 | 10/2003 | Taylor et al. | |

OTHER PUBLICATIONS

Xiaodong Wang and H. Vincent Poor, "Iterative (Turbo) Soft Interference Cancellation and Decoding for Coded CDMA," IEEE Transactions on Communications, vol. 47, No. 7 Jul. 1999.
S. Verdu, Multi-User Detection, Cambridge University Press, 1998.
PCT International Search Report dated Feb. 2, 2004 of International Application No. PCT/US03/30382 filed Sep. 25, 2003.
"Iterative Multiuser Interference Reduction: Turbo CDMA" by Alexander, et al. IEEE Transactions on Communications; vol. 47, No. 7, Jul. 1999.
"Iterative (Turbo) Soft Interference Cancellation And Decoding For Coded CDMA", by Wang, et al.; IEEE Transactions on Communications; vol. 47, No. 7, Jul. 1999.

* cited by examiner

*Primary Examiner*—Kevin Kim
(74) *Attorney, Agent, or Firm*—Daniel J. Long; Robert K. Tendler

(57) ABSTRACT

A system is provided for use with a multi-user detector MUD, which dramatically decreases the processing time for separating out interfering transmissions from a number of users by eliminating from each processing iteration consideration of those bit estimates for which the probability or estimate of their value exceeds a predetermined threshold and can therefore be declared "certain". In a Turbo MUD environment in which the output of the MUD is coupled back to the MUD through an error correction system, the output of the error correction is thresholded such that those bit estimates having probabilities or estimates greater than a predetermined threshold are assigned a quantized value and are eliminated from further processing by the MUD. For certain low-complexity processing Turbo MUDs there can be as much of a reduction as one-third in processing time, whereas for full MUD processing, the reduction in processing time can be as much as $\frac{1}{30}$th.

6 Claims, 2 Drawing Sheets

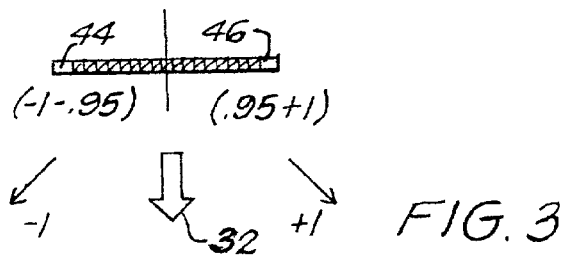
FIG. 3
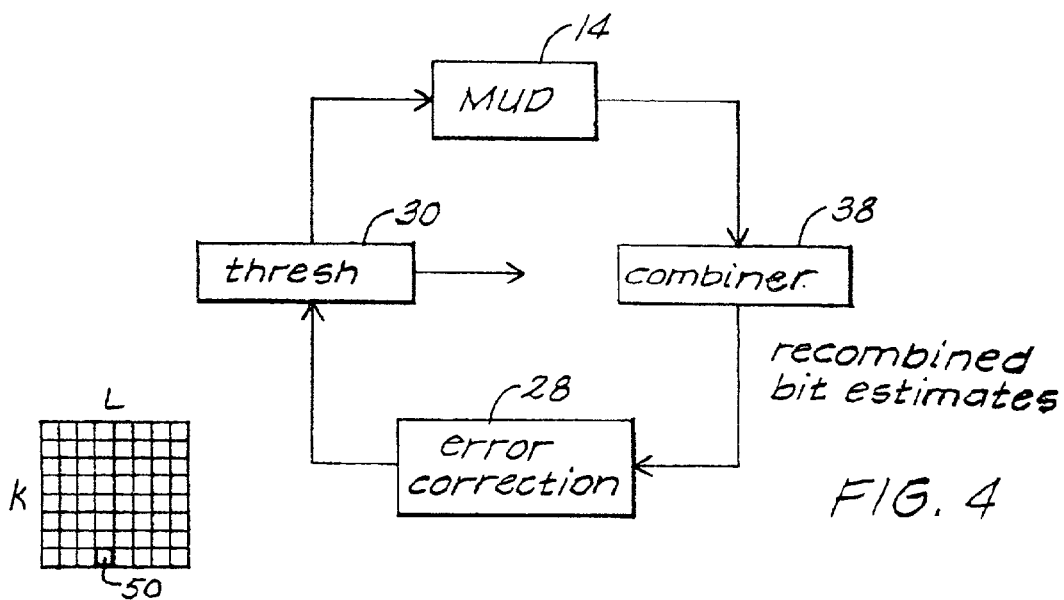
FIG. 4
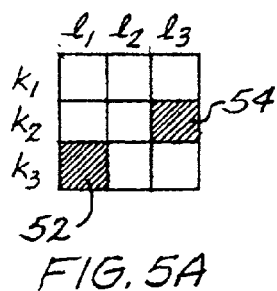
FIG. 5A
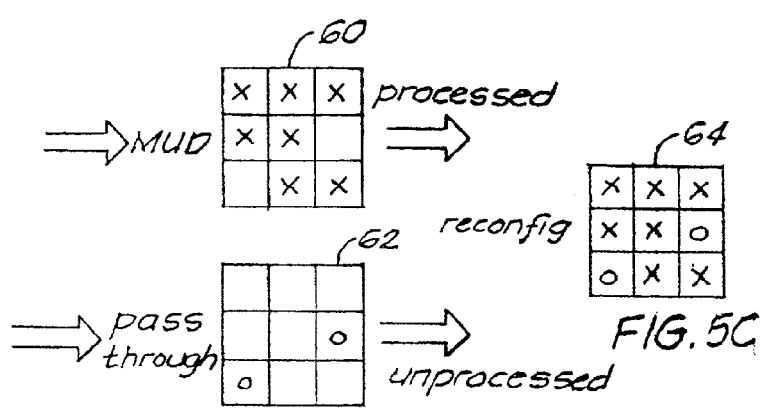
FIG. 5B
FIG. 5C

SYSTEM FOR DECREASING PROCESSING TIME IN AN ITERATIVE MULTI-USER DETECTOR SYSTEM

FIELD OF INVENTION

This invention relates to telecommunications, or more particularly, to a system for reducing the complexity of a multi-user detector system by eliminating from processing those bits having a highly confident prior estimate of their value.

BACKGROUND OF THE INVENTION

The problem of separating out or disambiguating interfering digital transmissions from different users has been resolved in the past by utilizing multi-user detectors as described in Verdu, "Multiuser Detector", Cambridge University Press, 1998 and by Wang and Poor, "Iterative Turbo Soft Interference Cancellation and Decoding for Coded CDMA, IEEE Transactions on Communications," July, 1999, as well as a patent application Ser. No. 09/923,709, filed by Rachel Learned et al on Aug. 7, 2001, entitled Method For Overusing Frequencies To Permit Simultaneous Transmission Of Signals From Two Or More Users On The Same Frequency and Time Slot, and incorporated herein by reference.

For full multi-user detection systems which examine the entire universe of possibilities for each bit from each user, the processing time is inordinately long. The processing time is, of course, exponentially proportional to the number of interfering signals that exist. In general, processing time has been reduced by several suboptimal methods through the examination of less than the entire number of possibilities for a given bit from a given user. A Turbo MUD is one such example.

More particularly, for terrestrial-based CDMA wireless communication systems, if it were possible to be able to accommodate a larger number of users on the same channel, meaning transmitting at the same frequency at the same time, then network utilization could be increased dramatically. CDMA systems exist that can accommodate a given number of simultaneous users and in general, use matched filtering techniques for separating out the signals. When, however, these systems have more users than they were designed for, or practical limitations result in a fewer number of users than can actually be accommodated, then a so-called over-saturated condition occurs.

One way of addressing the over-saturation issue is to utilize multi-user detectors to be able to separate out the interfering signals. One of the problems with the utilization of multi-user detectors, MUDs, in over-saturated environments is the processing time necessary to be able to separate out the interfering signals. In some over-saturated cases, only full MUD processing is available to be able to separate out the signals.

It will be appreciated that iteratively processing MUDs, called Turbo MUDs, are generally designed as a low-complexity way of being able to duplicate the functions of a full MUD. The low-complexity MUDs use considerably less processing time than full MUDs, making possible real-time recovery of the interfering signals. Note that Turbo MUDs in general utilize the information in forward error correction codes to be able to accomplish their task.

The result is that while Turbo MUD techniques have considerably improved processing times with respect to separating out the interfering signals, when either over-saturation occurs or becomes severe; or in fact, when processing times are to be reduced regardless, it is important to be able to quickly arrive at a value for a given bit for a given user, meaning that the error rate drops below an acceptable level for the particular communication scheme involved.

For an entire class of Turbo MUDs, the MUD processes the incoming signals on a time instant by time instant basis to provide for each user a series of best guesses as to what the individual bit should be for a given time. These best guesses, commonly known as soft outputs, are utilized in an error correction device, usually a single-user detector such as a BCJR Decoder, the purpose of which is to provide error correction for the bits for each user by comparing the present bit to a prior bit and/or a subsequent bit.

The result of such an error correction is a matrix of bit estimates which ordinarily are used by the MUD in the iterative process to provide better estimates of the particular bit. The number of iterations necessary to reduce the error rate to a predetermined acceptable level is a function of a number of factors, most notably the number of simultaneous users.

In the past, such processing has taken a long period of time, so long that the result is considered a non-real time response.

For instance, the conventional, minimum mean squared error, MMSE, multi-user detector which is described by Wang and Poor mentioned above, is relatively slow. It involves an iterative process for separating interfering signals in which the output of an error corrector is fed back to a multi-user detector for the purpose of obtaining better guesses as to the individual bits in the incoming data stream on the subsequent iterations.

SUMMARY OF THE INVENTION

Rather than passing back all of the estimates for the bits for the various users from the error corrector, in the subject invention, those bit estimates which are relatively certain are assigned a quantized value, in one case either +1 or −1, and are eliminated from consideration in the follow-on iterative MUD process. The remaining estimates which are below the particular threshold are processed by the MUD, with the unprocessed relatively certain bit estimates combined with the output from the MUD during the next iteration. This dramatically decreases processing time.

Each time one eliminates one bit estimate from consideration of the bit estimates that the MUD is processing, one cuts in half the amount of processing time necessary for the MUD to process the remaining bit estimates for BPSK. The reduction in processing time can be dramatic in the sense that if there are 10 users being processed by the MUD, if bit estimates from three users are eliminated as being "certain", then the MUD only has to process the bit estimates from seven users. In such an event, the MUD processing time is cut in half because of the first certain bit estimate, half again for the second certain bit estimate and half again for the third certain bit estimate. This means the processing time for the MUD in the next iteration is only 12% of the time necessary if one were to process all 10 bit estimates.

Depending on the number of bit estimates in a given iteration that can be declared "certain", processing times can be dramatically decreased for the MUD on the next iteration. In the above example, this is done by decreasing the processing time so that the processing time is only 12% of what it would have had to spend had none of the bit estimates been declared "certain".

In summary, a system is provided for use with a multi-user detector MUD, which dramatically decreases the processing time for separating out interfering transmissions from a number of users by eliminating from each processing iteration consideration of those bit estimates for which the probability or estimate of their value exceeds a predetermined threshold and can therefore be declared "certain". In a Turbo MUD environment in which the output of the MUD is coupled back to the MUD through an error correction system, the output of the error correction is thresholded such that those bit estimates having probabilities or estimates greater than a predetermined threshold are assigned a quantized value and are eliminated from further processing by the MUD. For certain low-complexity processing Turbo MUDs there can be as much of a reduction as one-third in processing time, whereas for full MUD processing, the reduction in processing time can be as much as ⅓₀th.

BRIEF DESCRIPTION OF THE DRAWINGS

These and other features of the subject invention will be better understood in connection with the Detailed Description in conjunction with the Drawings, of which:

FIG. 3 is a diagrammatic illustration of the thresholding of FIG. 2 illustrating that bits that lie between −1 and −0.95 are assigned the −1 value, whereas bits lying between 0.95 and +1 are given a +1 value;

FIG. 4 is a block diagram illustrating the thresholding and the combining associated with the system of FIG. 2, illustrating that for a K by L matrix, thresholding results in a processing advantage for the MUD;

FIG. 5A is a schematic diagram of two of the bits in the K by L matrix of FIG. 4 having certain values;

FIG. 5B is a diagrammatic illustration of the processing of the values from the matrix of FIG. 4 indicating that the MUD processes seven of the best estimate values in the feedback loop, whereas two of the certain values are passed through; and, FIG. 5C is a diagrammatic illustration of the combining of the signals from the MUD which are processed on the next iteration combined with the unprocessed signals so as to provide the error correction unit of FIG. 4 with appropriate estimates.

DETAILED DESCRIPTION

Figure 1:
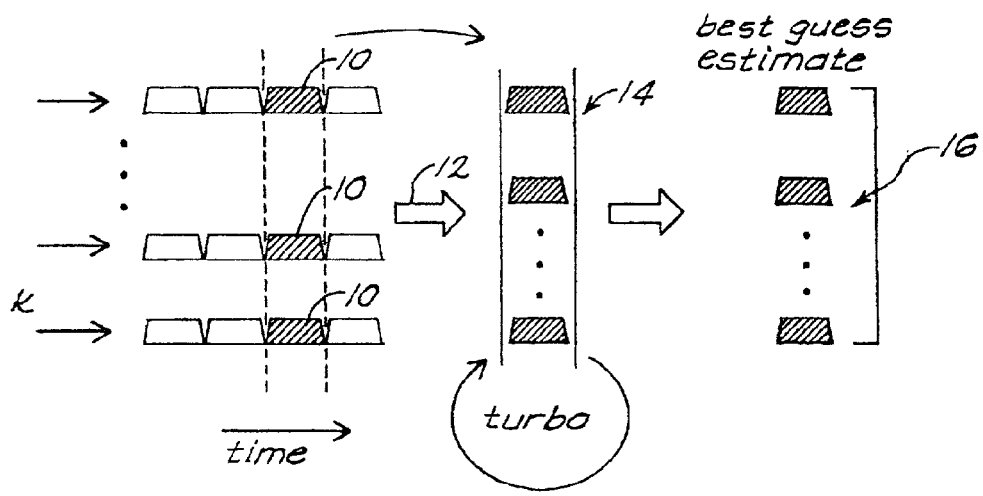
FIG. 1 is a diagrammatic representation of the processing of incoming data streams, each corresponding to a different user in which on a time interval by time interval basis the multi-user detector determines what the individual bits are by providing as an output a best guess or estimate of what the individual bit should be, with the processing by the multi-user detector being iterative.

Referring now to FIG. 1, what is depicted is a stream of data from a number of different users. They may, for instance, be from multiple CDMA cellphones which are operating on the same frequency and transmitting at the same time, and which produce interfering signals. It may also be the result of a number of cable boxes communicating with a head end system, again on the same frequency and at the same time. Additionally, there may be multiple users for 802.11 wireless Local Area Networks or LANS, or there may be multiple ultra wideband users. Further, it may be interfering signals from adjacent tracks on a digital storage disk in which the read head is overlapping one or more of the highly dense tracks.

Regardless, what occurs is that a number of packets or chunks of data here illustrated at 10 are transmitted simultaneously, with typically each packet containing, for instance, 384 bits.

In order to separate out the interfering signals, the incoming signals are applied as illustrated by arrow 12 to a Turbo MUD 14 which processes the incoming signals and provides best guesses or estimates of the individual bits for each user, as illustrated at 16. These best guesses or estimates are then applied in a feedback loop to the MUD so as to increase the likelihood that the particular bit is what it is supposed to be. This is done in an iterative process until such time as the error rate is statistically known to drop below a predetermined value. When it does, the bits corresponding to the digital incoming streams are outputted such that the incoming data is recovered with the interfering signals having been separated by the Turbo MUD.

Figure 2:
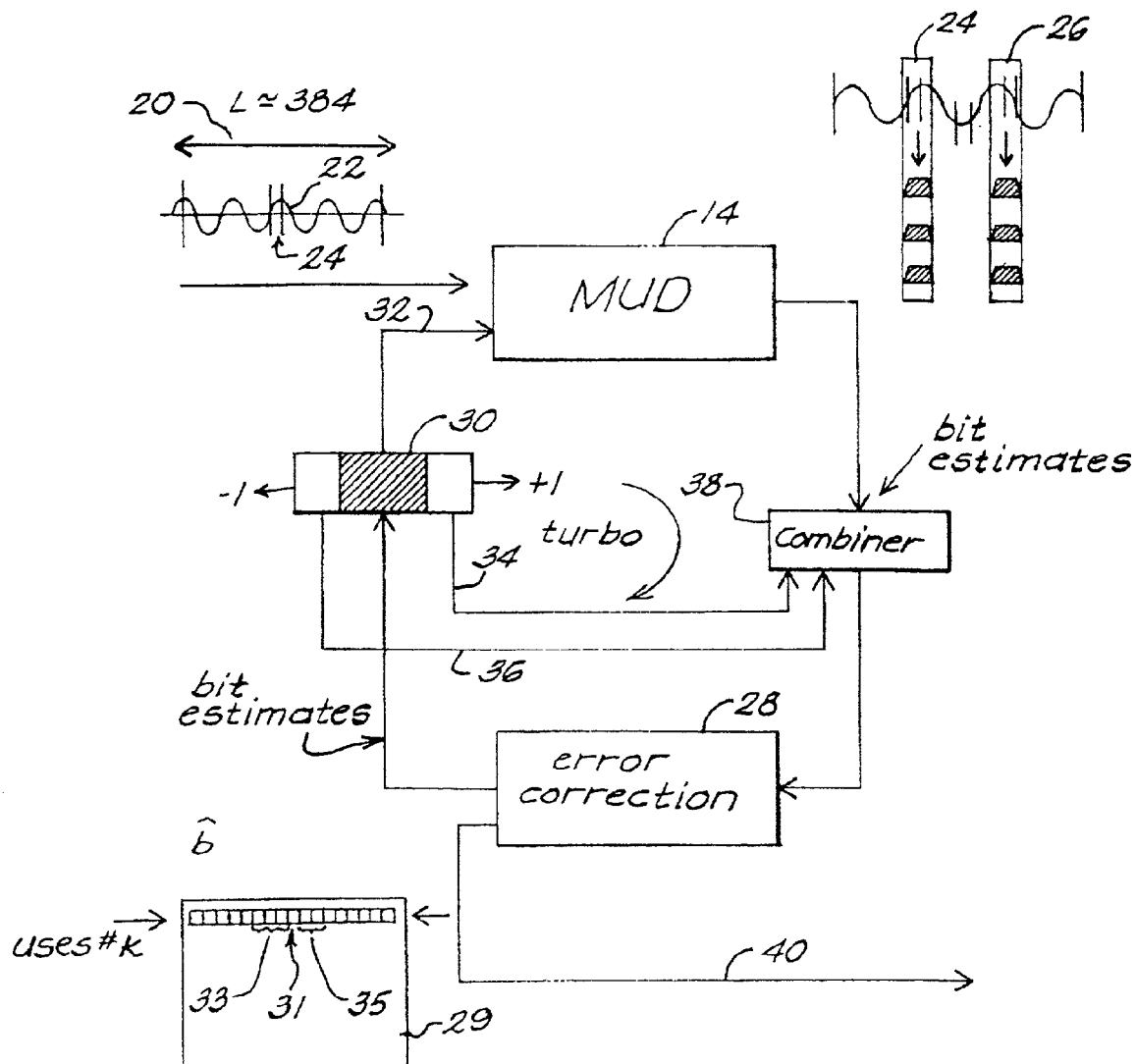
FIG. 2 is a block diagram illustrating the subject system in which soft outputs from the MUD are coupled back through an error corrector, with the best estimate averages being thresholded such that those estimates having a certain degree of certainty are ascertained and are not passed through in the feedback loop back to the MUD, but rather are utilized in a combiner, with the processing by the MUD being substantially reduced by ignoring those bits of relative certainty.

Referring to FIG. 2, more particularly, MUD 14 is shown to be able to process independent bits in the bit stream where L is used to indicate that there are, in one embodiment, 384 bits during the L time interval. The L time interval is illustrated at 20 to delineate a portion of an incoming data stream of interfering signals illustrated by waveform 22.

The MUD considers only a bit-size portion of these incoming signals at a time, here illustrated by 24 and processes these signals so as to produce a number of best estimates of the bits from each of the users at that time instant. Here the best estimates for a first user are illustrated in column 24 and for a second user in column 26.

These estimates in terms of real numbers called soft MUD outputs are coupled to an error correction unit 28 which performs error correction functions such that as illustrated at 29 which determines the likelihood that a bit is either 1 or 0 in one embodiment based on a window of preceding and succeeding bits for each user. Thus a bit 31 is determined by the bits in the preceding window 33 and the succeeding window 35.

The output of the error correction unit is applied back to MUD 14 so as to permit iterative processing of the bits for increasing the likelihood that a particular bit is what it is said to be.

This iterative processing is what takes an inordinate amount of time even under the best of circumstances due to the enormous number of possibilities for each of the bits from each of the users.

It is the purpose of the subject invention to be able to eliminate from consideration during the next iteration of the MUD those bits that are determined to be almost certain. It will be shown that on the subsequent iteration assuming for instance out of 10 bits three are certain, then the processing by the MUD on the next iteration can be reduced to 12% of what the processing was during the last iteration.

In order to do this, a thresholding unit 30 eliminates from being passed back to the MUD those bits that are determined to be certain enough so that they can be assigned either −1 or +1 in one embodiment. This thresholding unit passes through the relatively uncertain bit estimates on line 32 and passes through the relatively certain bit estimates as their quantized values, +1 or −1, on lines 34 and 36 to a combining unit 38, which combines these certain bits with the recomputed best guesses from MUD 14 on the next iteration. The result is that the information provided to error corrector 28 on the next iteration takes into account the certain bits and also the recomputed best guesses for the remainder of the bits and processes these combined estimates.

The output of the error correction unit is again fed back to MUD 14 through thresholding unit 30, such that on this next pass, even more bits can be declared certain, with the following iteration only considering the leftover uncertain bit estimates, again resulting in a dramatic processing advantage on this subsequent iteration.

When the output of the error correction unit is predicted to have an error rate less than a predetermined figure, then the iteration stops and the output is available on line 40 as the separated and demodulated signals.

Referring to FIG. 3, it will be appreciated that thresholding unit 30, in the illustrated embodiment, determines those bit estimates, for instance, between −1 and −0.95 probability of being correct and between +0.95 and +1 probability of being correct, respectively returning a −1 and +1, while the estimates of the other bits are passed through as illustrated by arrow 32. What can be seen is that the thresholding is such that only those bit estimates which exist to either side of the thresholds as illustrated at 44 and 46 are those "certain" bits that are directly coupled to combiner 38 of FIG. 2, whereas the remaining bit estimates are those that are passed through to MUD 14.

Referring now to FIG. 4, what will be seen is that given a K×L matrix, then a predetermined subset 50 reflects a limited number of users and a limited number of bits.

Referring to FIG. 5A, if this subset includes three users, $k_1$, $k_2$ and $k_3$ and three time intervals, $l_1$, $l_2$ and $l_3$, and further assuming that due to the thresholding action of thresholding circuit 30, the $k_3 l_1$ bit, here illustrated at 52 and the $k_2 l_3$ bit here illustrated at 54 are deemed certain then on the second iteration by MUD 14 the bit estimates which are to be processed by MUD 14 are illustrated at 60, in FIG. 5B, whereas bit estimates which have now been quantized and are not further processed by the MUD, i.e. unprocessed, are illustrated at 62 in this figure.

The processed and unprocessed bits are thereafter combined at 38 such that the result that is coupled to the error corrector 28 is as illustrated at 64 in FIG. 5C. As will be appreciated, after the thresholding, that which was passed through on the next iteration to error corrector 28 are new best estimates of what the bits should be, along with the certain bits. This enables the error corrector to better process the output from combiner 38 and to provide better estimates back through the thresholding circuit to MUD 14.

The result is that the final bit estimates are more quickly ascertained, which results in dramatically reduced processing times. Thus the original incoming interfering signals are recovered quicker with fewer iterations and less computation.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for decreasing the processing time for separating out interfering transmissions from a number of users in an iterative multi-user detector, comprising the steps of:
   providing a multi-user detector for demodulating signals from multiple users on the same frequency at the same time using an iterative multi-user detection technique;
   providing bit value estimates from the multi-user detector; and,
   eliminating from each processing iteration consideration of those bits for which the estimate of the value thereof exceeds a predetermined threshold, whereby selected bit estimates exceeding the threshold are considered certain and are not used in the next iteration of processing of the multi-user detector.

2. In an iterative multi-user detector in which the output of said multi-user detector is coupled back through an error correction unit to said multi-user detector, apparatus for decreasing processing time for separating out interfering signals, comprising:
   a thresholding circuit coupled to the output of said error connection unit for assigning a value for each bit estimate above a predetermined threshold representing a quarantized value; and,
   a processing reduction unit for eliminating from consideration by said multi-user detector all of said quantized values and for coupling said quantized values to the input of said error correction unit to be used on the next iteration in combination with the output of said multi-user detector, whereby processing time is decreased.

3. The apparatus of claim 2, wherein said multi-user detector is a full processing detector.

4. The apparatus of claim 2, wherein said multi-user detector is a low complexity detector.

5. The apparatus of claim 2, and further including a combiner coupled between the output of said multi-user detector and said error connection unit for combining the output of said multi-user detector with said quantized value.

6. In an iterative multi-user detector in which the output of the multi-user detector is coupled back through an error correction unit to the multi-unit detector, a method for decreasing processing time for the separating out of interfering signals, comprising the steps of:
   thresholding the output of the error correction unit to identify bits having an estimated value above a predetermined threshold; and,
   eliminating from each processing iteration consideration of those bits identified as having a value estimate exceeding the predetermined threshold to eliminate these bit estimates from consideration, whereby those bit estimates exceeding the threshold are considered certain and are not used in the next iteration of the multi-user detector processing.

\* \* \* \* \*